United States Patent
Seydoux et al.

(10) Patent No.: US 9,747,725 B2
(45) Date of Patent: Aug. 29, 2017

(54) VIDEO SYSTEM FOR PILOTING A DRONE IN IMMERSIVE MODE

(71) Applicant: Parrot Drones, Paris (FR)

(72) Inventors: Henri Seydoux, Paris (FR); Gaspard Florentz, Paris (FR)

(73) Assignee: Parrot Drones, Paris (FR)

( * ) Notice: Subject to any disclaimer, the term of this patent is extended or adjusted under 35 U.S.C. 154(b) by 30 days.

(21) Appl. No.: 14/923,307

(22) Filed: Oct. 26, 2015

(65) Prior Publication Data

US 2016/0148431 A1 May 26, 2016

(30) Foreign Application Priority Data

Nov. 26, 2014 (FR) ..................... 14 61501

(51) Int. Cl.
| | |
|---|---|
| *G02B 27/00* | (2006.01) |
| *G06T 19/00* | (2011.01) |
| *G02B 27/01* | (2006.01) |
| *G06T 19/20* | (2011.01) |
| *H04N 5/247* | (2006.01) |
| *H04N 7/18* | (2006.01) |
| *A63H 27/00* | (2006.01) |
| *A63H 30/04* | (2006.01) |
| *A63G 31/16* | (2006.01) |
| *G06T 7/70* | (2017.01) |

(52) U.S. Cl.
CPC ............ *G06T 19/006* (2013.01); *A63G 31/16* (2013.01); *A63H 27/12* (2013.01); *A63H 30/04* (2013.01); *G02B 27/0093* (2013.01); *G02B 27/017* (2013.01); *G06T 7/70* (2017.01); *G06T 19/20* (2013.01); *H04N 5/247* (2013.01); *H04N 7/183* (2013.01)

(58) Field of Classification Search
None
See application file for complete search history.

(56) References Cited

U.S. PATENT DOCUMENTS

| 3,564,134 A | 2/1971 | Rue et al. | |
|---|---|---|---|
| 2013/0038692 A1* | 2/2013 | Ohtomo | G05D 1/0038 348/46 |

FOREIGN PATENT DOCUMENTS

| EP | 2 364 757 A1 | 9/2011 |
|---|---|---|
| EP | 2 557 468 A2 | 2/2013 |
| FR | 2 922 666 A1 | 4/2009 |
| JP | 2010 152835 A | 7/2010 |
| WO | 98 46014 A1 | 10/1998 |

\* cited by examiner

*Primary Examiner* — Nicholas R Wilson
(74) *Attorney, Agent, or Firm* — Haverstock & Owens LLP

(57) ABSTRACT

This system comprises a drone and a remote station with virtual reality glasses rendering images transmitted from the drone, and provided with means for detecting changes of orientation of the user's head. The drone generates a "viewpoint" image (P'1) and a "bird's eye" image (P'2) whose field is wider and whose definition is lower. When the sight axis of the "viewpoint" image is modified in response to changes of position of the user's head, the station generates locally during the movement of the user's head a combination of the current "viewpoint" and "bird's eye" images, with outlines (CO') adjusted as a function of the changes of position detected by the detection means.

9 Claims, 4 Drawing Sheets

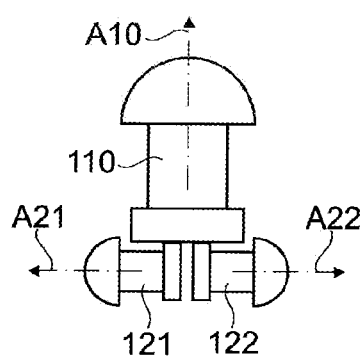
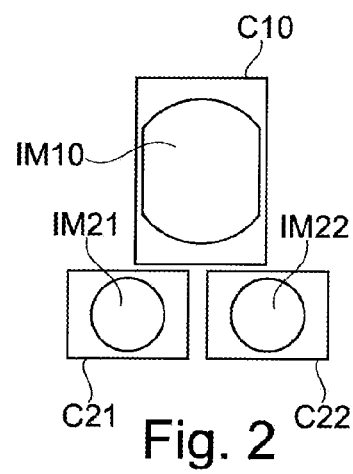
Fig. 1
Fig. 2
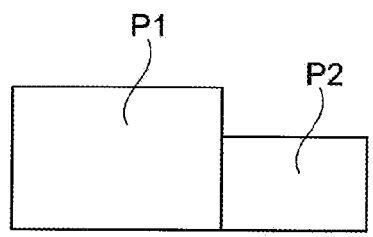
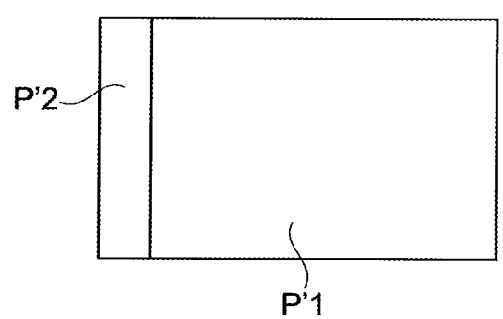
Fig. 3
Fig. 4
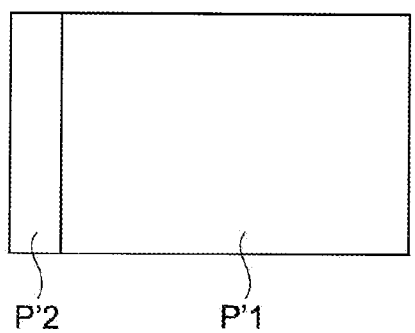
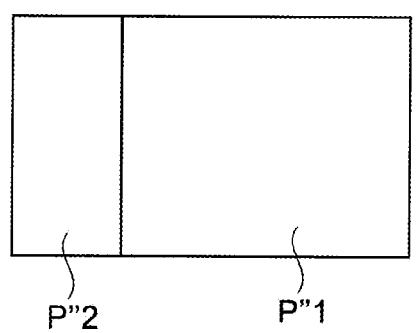
Fig. 5A
Fig. 5B

VIDEO SYSTEM FOR PILOTING A DRONE IN IMMERSIVE MODE

The invention relates to the remote-controlled motorized devices, hereinafter generally referred to as "drones".

They may be flying drones, in particular rotary-wing drones such as helicopters, quadricopters or the like. But the invention is however not limited to piloting and exchanging data with flying devices; it applies as well to rolling devices progressing on the ground under the control of a remote user, the term "drone" having to be understood in its most general meaning.

A typical example of flying drone is the AR.Drone 2.0 or the Bebop of Parrot SA, Paris, France, which are quadricopters equipped with a series of sensors (accelerometers, 3-axis gyrometers, altimeter), a front camera capturing an image of the scene towards which the drone is directed, and a vertical-view camera capturing an image of the overflown ground.

The documents WO 2010/061099 A2 and EP 2 364 757 A1 (Parrot SA) describe such a drone as well as its principle of piloting by means of a touch-screen device with an integrated accelerometer, for example a smartphone of the iPhone type or a tablet of the iPad type (registered trademark). These devices incorporate the various control members required for the detection of the piloting commands and for the bidirectional exchange of data with the drone via a wireless link of the Wi-Fi (IEEE 802.11) or Bluetooth local network type. They are further provided with a touch screen displaying the image captured by the front camera of the drone, with, in superimposition, a certain number of symbols allowing the activation of commands by simple contact of the user's finger on this touch screen.

The front video camera of the drone can be used in particular for an "immersive mode" or FPV (First-Person View) piloting, i.e. where the user uses the image of the camera in the same way as if he was himself on board the drone. It may also serve to capture sequences of images of a scene towards which the drone is directed. The user can hence use the drone in the same way as a camera or a camcorder that, instead of being held in hand, would be borne by the drone. The collected images can be recorded, broadcast, put online on web sites, sent to other Internet users, shared on social networks, etc.

In order to correctly film the flight, it is firstly necessary to have a orientable and stabilized camera. For that purpose, the camera may be mounted on a universal-joint system, or an electronic image stabilization may be provided.

However, such a stabilized image return obtained from the shooting camera of the drone is not ideal for this type of FPV piloting. In particular, the image stabilization leads to the fact that it does no longer reflect to the pilot the essential information such as the attitude of the aircraft. And, more particularly, in the case of a hovering drone such as a quadricopter, the conventional image return of the shooting camera is not very interesting. Indeed, with such a drone, it is searched to manoeuver the closest possible to the obstacles, for example to film a point while flying between the piers of a bridge.

It is hence desirable that the pilot be able, in such a case, to "have a look" on the left and on the right during the shooting with the image-stabilized camera.

In a conventional FPV device, the virtual reality pair of glasses is equipped with a gyroscope and an accelerometer so as to take into account the displacements of user's head. The conventional principle of operation comprises the following steps:

a) measuring the movement of the pilot's head;
b) sending the new position of the pilot's head to the drone;
c) moving the viewpoint of the drone camera as a function of the new position of the pilot's head;
d) acquiring an image;
e) reprocessing the image in the case where the camera has a very deforming optical system such as a fisheye-type lens;
f) encoding the video image;
g) transmitting the video image of the drone to the ground station;
h) decoding the video image in the ground station; and
i) projecting back the video image in the ground station for each of the eyes.

Such a camera orientation control technique based on sensors mounted on a virtual reality FPV pair of glasses is described in particular in the EP 2 557 468 A2.

Each of the above-mentioned steps take a certain time and, even with the present electronic means, it is very difficult to perform this set of steps in less than 200 ms (i.e. six images for a framerate of 30 images/second), mainly due to the times of data transfer at steps b) and g). This latency results in a lack of correlation between the movements of the pilot's head and the image displayed in the virtual reality glasses, which often causes nausea to the user.

A solution to avoid this problem could consist in capturing an image over 360° on the drone and transferring it directly to the ground station. That way, the above steps b), c) and g) would not be required any more.

However, transmitting from the drone to the ground station a full image of the scene over 360° with the desired definition requires a significant bandwidth, incompatible with the relatively limited working data rate of the transmission channel between the drone and the ground station.

One object of the invention is to propose a shooting system which allows to significantly improve the experiment of piloting a drone in FPV mode with virtual reality glasses, by reducing the latencies observed at the time of movements, sometimes abrupt, of the user's head.

The invention proposes for that purpose a system for piloting a drone in immersion, comprising, in a manner known per se, in particular from the above-mentioned EP 2 557 468 A2, a drone provided with shooting means and a ground station comprising: virtual reality glasses rendering images captured via the shooting means and transmitted from the drone by wireless communication means; means for detecting changes of orientation of the head of a user wearing the glasses; as well as ground graphic processing means adapted to generate the images rendered.

The system also comprises means for generating on board the drone a first image, called the "viewpoint" image, and transmitting this first image to the ground graphic processing means, and means provided in the drone to modify the sight axis of the "viewpoint" image in response to changes of position of the user's head detected by the detection means and transmitted to the drone via the wireless communication means.

Characteristically of the invention, the system further comprises means for generating on board the drone a second image, called the "bird's eye" image, whose field is wider and whose angular definition is lower than those of the "viewpoint" image, and transmitting this second image to the ground graphic processing means. The ground graphic processing means are moreover adapted to generate locally during a movement of the user's head, by a combination of the current "viewpoint" and "bird's eye" images present in the ground station, images to be rendered, with outlines adjusted as a function of the changes of position detected by the detection means.

It will be noted that, concretely, the two "viewpoint" and "bird's eye" images can be distinct images, but also, equivalently, be merged into a single and same global image whose angular resolution is higher in a "viewpoint" area (which is then equivalent to the "viewpoint" image) than in the remaining of the global image (which is then equivalent to the "bird's eye" image).

The system also optionally comprises the following advantageous characteristics, considered individually or according to any combination the one skilled in the art will know as technically compatible:
- the ground graphical processing means are adapted to perform an incrustation of the current "viewpoint" image in the current "bird's eye" image and to apply variable cropping operations to the so-obtained image;
- the shooting means comprise a set of wide-field shooting cameras of different sight axes;
- the shooting means comprise cameras with different definitions for the "viewpoint" images and the "bird's eye" images;
- the shooting means comprise a common set of cameras all having the same definition, and circuits for generating images of different definitions from the common set of cameras;
- the system comprises a set of cameras of complementary fields covering together all the directions in a horizontal plane;
- the system comprises a first camera whose sight axis is arranged according to a main axis of the drone, and two cameras of lower definitions, whose sight axes are oriented to the left and to the right, respectively, with respect to the main axis;
- the two lower-definition cameras are of complementary fields covering together all the directions in a horizontal plane;
- at least certain cameras have optical systems of the fisheye type, and means for correcting the distortions generated by the type of optical system are provided.

An example of implementation of the invention will now be described, with reference to the appended drawings in which the same references denote identical or functionally similar elements throughout the figures.

FIG. 1 schematically illustrates an arrangement of three shooting cameras that can be used in the system of the invention.

FIG. 2 illustrates, for each camera, the area of the sensor thereof that is effectively exploited.

FIG. 3 schematically illustrates two types of image transmitted by the set of cameras of FIGS. 1 and 2.

FIG. 4 schematically illustrates the combination of parts of the two images when, in the present example, it is detected that the FPV glasses wearer turns his head to the left.

FIGS. 5A and 5B illustrate two combinations of parts of images when a fast rotation of the head to the left is detected.

Figure 9A:
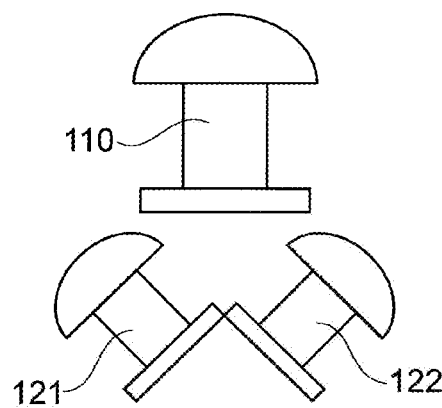
Figure 9B:
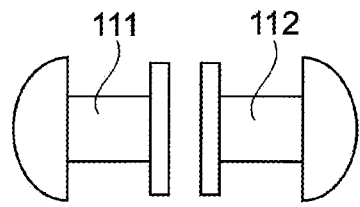
Figure 9C:
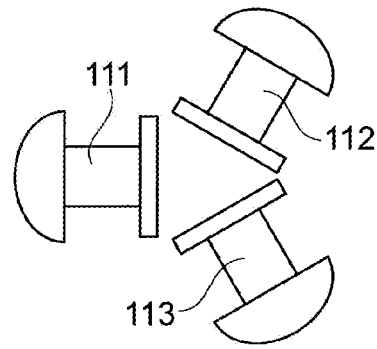

FIGS. 9A to 9C schematically illustrate other arrangements of cameras which can be used in the system of the present invention.

An "immersive mode" or "FPV" shooting system according to the present invention comprises a drone equipped with a set of shooting cameras, and a ground equipment communicating with the drone through a wireless link of suitable range and comprising virtual reality glasses, provided with means for rendering in front of the user's eyes images giving him the feeling of flying on board the drone, in the most realistic manner possible.

The cameras equipping the drone are wide-field cameras, such as cameras with an optical system of the fisheye type, i.e. provided with an hemispherical field lens covering a field of about 180°.

In a first embodiment of the invention, and with reference to FIG. 1, the drone 10 has three shooting cameras 110, 121 and 122.

A first camera or main camera 110 has a fisheye-type lens, whose sight axis A19 is directed forward. It has a great sensor with a significant number of pixels, typically from 8 to 20 Mpixel with the current technologies.

As illustrated in FIG. 2, the fisheye lens of the main camera 110 generates an image of circular outline IM10 for the main camera, whose limit circle preferably protrudes laterally with respect to the rectangular limits of the sensor C10, so as to favour the number of pixels exposed, to optimize the sensor surface occupancy, which is generally of 4/3 ratio, and to favour the shooting in a top-to-bottom direction.

The drone has further two auxiliary cameras 121, 122 pointing in the present example to each of the two sides of the drone as shown in FIG. 1, with collinear and opposite sight angles A21, A22. These cameras are also equipped with fisheye lenses, but have sensors C21, C22 of smaller size, provided with also smaller lenses. For these cameras, as also illustrated in FIG. 2, the image circle, IM21, IM22, respectively, is integrally contained in the extent of the respective sensor C21, C22. Typically, sensors used for the sensors C21, C22 are sensors with a definition of the order of 3 Mpixel with the current technologies, of the type used for full high definition (full HD) cameras. In the present example, about 1.8 Mpixel are effectively illuminated by the respective fisheye lens.

As will be seen hereinafter, the two auxiliary sensors may have any orientation, provided that their respective sight axes are essentially opposite to each other, an object in particular being that the junction between the two images, each covering about half a sphere, is located at the less cumbersome place for the sight and/or for the processing operations to be performed. It may moreover be provided not to cover the angular area located close to the upward vertical, which is the less useful. For example, the part of the image above 70° upward may be neglected.

From this set of cameras, the electronic circuitry of the drone transmits to the ground station two images intended to be processed as seen for a combined rendering to the ocular displays of a pair of virtual reality glasses.

A first image P1, called the "viewpoint" image, is that captured by the camera 110, reflecting the viewpoint of a virtual pilot of the drone, and a second image P2, called the "bird's eye" image, is that, combined by the on-board electronic circuitry, which comes from the two lateral cameras 121 and 122. The first image is a full-definition image corresponding to a limited field of view, whereas the second image is an image of lower resolution over a field of view of 360° horizontally, and 360° or slightly less vertically.

It will be noted that the focal distances of the three cameras are all the same so that a superimposition of the two images between them can be performed with no anomaly.

FIG. 3 reflects by the size of the images P1 and P2 the bulk linked to the angular resolution per pixel of these images, the image P1 being bulkier in terms of bandwidth than the image P2, hence represented with a smaller size.

It will be noted that the invention may be advantageous in a case where a VGA image (640×480) is used for the "viewpoint" area of about 90°×90° of field of view, and another VGA image is used for the remaining (field of view of 360°×360°).

The different steps implemented in a system according to the invention to obtain in the virtual reality glasses an image reflecting an experiment of the FPV type will now be described.

Generation and Transmission of the "Viewpoint" Image P1

This step implements the following operations:
1) a sensor (accelerometer or other) equipping the glasses measures the movements of the user's head;
2) the information of position of the user's head is periodically sent to the circuitry of the drone from that of the ground station via the wireless communication channel, with a rate typically corresponding to that of the images to be rendered, for example at least 30 times per second;
3) on board the drone, the new sight axis for the "viewpoint" image is defined as a function of said head position information received;
4) each image captured by the camera is cropped as a function of this sight axis to generate the image P1;
5) in the circuitry of the drone, this image is, if necessary, reprocessed so as to compensate for the distortion induced by the fisheye lens (such a processing is known per se and will not be described in more detail);
6) the so-reprocessed image is coded, preferably with compression, with a suitable algorithm;
7) the compressed image is transmitted to the ground station via the wireless communication channel.

These operations are repeated for example at a rate of 30 images per second, with each time an updating of the sight axis A10 of the camera 110 and the corresponding cropping.

It will be noted herein that, as a variant, it could be provided a camera 110 movable in response to actuators to adjust its physical sight axis in response to the head position information.

According to another variant, the viewpoint image may, in the same way as the "bird's eye" image, be generated by combining the images captured by two or several cameras oriented differently.

Generation and Transmission of the "Bird's Eye" Image P2

This step implements the following operations:
1) two images are acquired by means of two lateral cameras 121 and 122;
2) the two images are combined into a single image by the on-board electronic circuitry;
3) the so-combined image is coded, preferably with compression, with a suitable algorithm;
4) the compressed image is transmitted to the ground station via the wireless communication channel.

Processing of the Images in the Ground Station

As long as the user does not move his head, the ground station displays in the glasses the "viewpoint" images P1 in high definition, streamed from the drone. A framerate of 30 images per second is herein possible because no cropping processing of the image captured by the camera 110 is required.

But when the user turns his head, all the steps of the hereinabove process of generation and transmission of the "viewpoint" image requires a time of processing that, as explained hereinabove, is incompatible with the searched framerate due to cropping operations of the image P1 to be performed for each individual image.

According to the invention, the electronic circuitry of the station constructs for the needs of the transition (i.e. until the user's head is fixed again) transition images from the freshest images P1 and P2 available at this time in the ground station, and the coordinates of the virtual reality glasses. These transition images are created from data fully available on the ground station and glasses side, by combination and cropping operations as just seen hereinabove. Given that no transfer via the communication channel is required and that only a cropping and a refreshing of the display have to be performed, the latency for this operation may be extremely low.

It is understood that the wider-field image P2 coming from the lateral cameras 121, 122 could be simply cropped at the ground and rendered to ensure the searched transition. But this image P2 has a lower definition than the "viewpoint" image normally generated with the camera 110, and such a solution would cause an abrupt drop of resolution of the whole image at the rendering of the transition.

To avoid this phenomenon, a combination of images is performed with the graphical processor equipping the ground station.

Hence, FIG. 4 illustrates a combination of images corresponding to the case where the user has turned his head to the left. In this example, the image to be rendered is obtained by combining, on the one hand, a fraction P'1 of the "viewpoint" image P1 obtained by eliminating a marginal part located on the right, whose width is all the more great that the angle of rotation of the user's head is great, and by completing the so-reduced image P'1, on the left edge thereof, with a fraction P' of the "bird's eye" image corresponding to this area.

This combination of fractions of images is hence performed by simple cropping and juxtaposition operations, the angular amplitude of the lateral rotation of the head being known and the correspondence between the referential system of the image P1 and that of the image P2 being also known, by construction.

Hence, the greatest part of the image rendered to the user remains in high definition, and only a marginal part of the image is in lower definition, and that only temporarily as long as the orientation of the user's head is not stabilized.

It is to be noted that the rate at which these cropping/juxtaposition operations are performed may be decorrelated from the rate of reception of the high-definition "viewpoint" images (typically 30 images per second with the current technologies), and be higher. In particular, the virtual reality glasses are able to perform a rendering at a rate of 75 images per second or more, and the above-mentioned cropping/juxtaposition operations being light enough in terms of graphical processor load, this rate is reachable.

During the whole period of transition, this generation of juxtaposed images will be performed as a function of the current position of the user's head. Hence, FIGS. 5A and 5B illustrate the simplified case where the ground station generates and displays two successive combinations of fractions, P'1, P'2 and P"1, P"2, respectively, of the images P1 and P2 available at the ground, the fraction P"2 being wider than the fraction P'2 due to the fact that, between the two instants, the user's head has continued to turn.

The implementation of the invention on real images will now be explained with reference to FIGS. 6A to 6C.

Figure 6A:
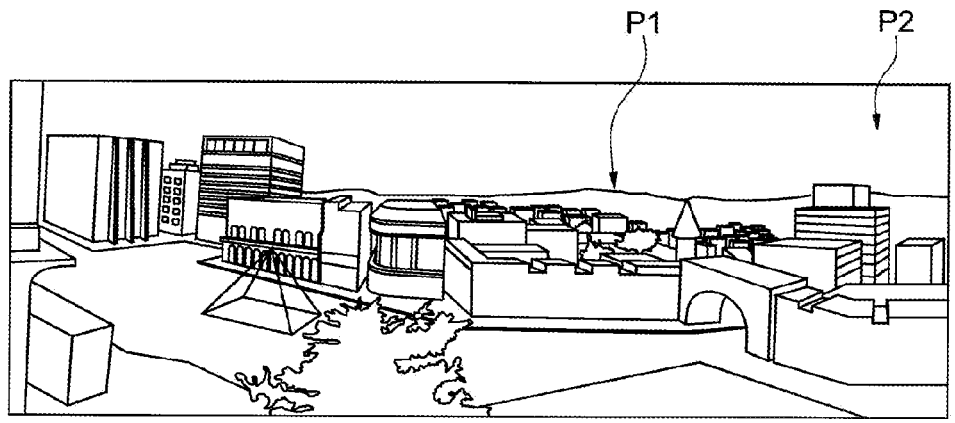
FIGS. 6A to 6C show a real image and, as for FIGS. 6B and 6C, two combinations of images according to the principle of FIG. 4 for two different positions of the user's head.

The image of FIG. 6A corresponds to an incrustation of the high-definition "viewpoint" image P1 into a "bird's eye" image P2 of the same scene, but with a wider field and a lower definition, the axes of the two images being merged. This incrustation is performed in the ground station, and indeed plays the role of the juxtaposition of the images as explained hereinabove.

Figure 6B:
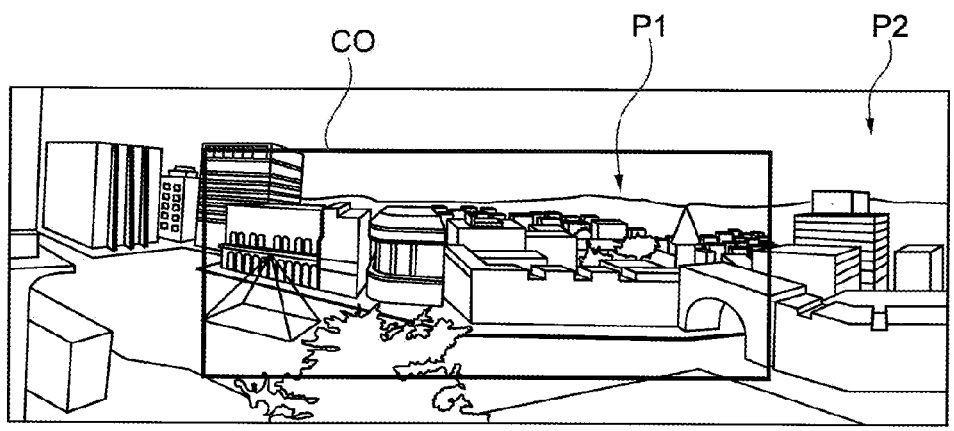
Figure 6C:
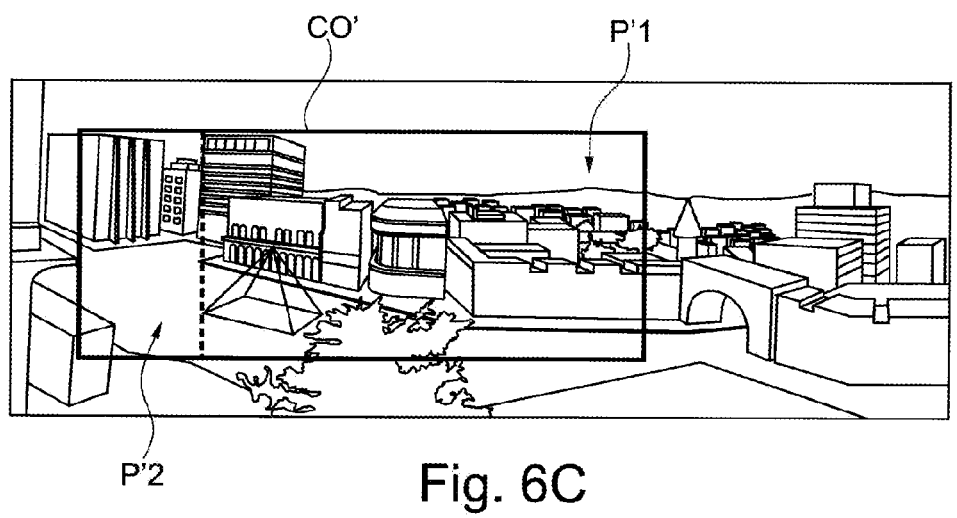

As long as the user keeps his head straight, the image rendered in the virtual reality glasses is the "viewpoint" image P1 alone, whose outlines CO are illustrated in FIG. 6B.

When the user turns his head, in the present example to the left, the outline of the image effectively rendered to the user (herein denoted CO') is shifted to the left, and it is understood that the image rendered to the user actually corresponds to a combination of a fraction P'1 of the image P1, deprived of a band of a determined width on the right, and of a fraction P2 of the image P2 located immediately on the left of the image P1 (the frontier between these two fractions of image being indicated in dotted-line in FIG. 6B).

Of course, the left part of the image is of less high definition, but it has the advantage to be immediately available to be combined to the truncated image P1, then displayed. It results therefrom an imperceptible latency and quality of image perfectly correct of the user.

Of course, the head rotation information is sent to the electronic circuitry of the drone to accordingly adjust the sight axis A10 of the camera 110, and to render to the ground station the new view generated by the camera 110, which will then be rendered in the glasses as long as the movements of the user's head will be slow enough to allow a goof fluidity without having to perform the cropping/combination processing operations described.

Figure 7:
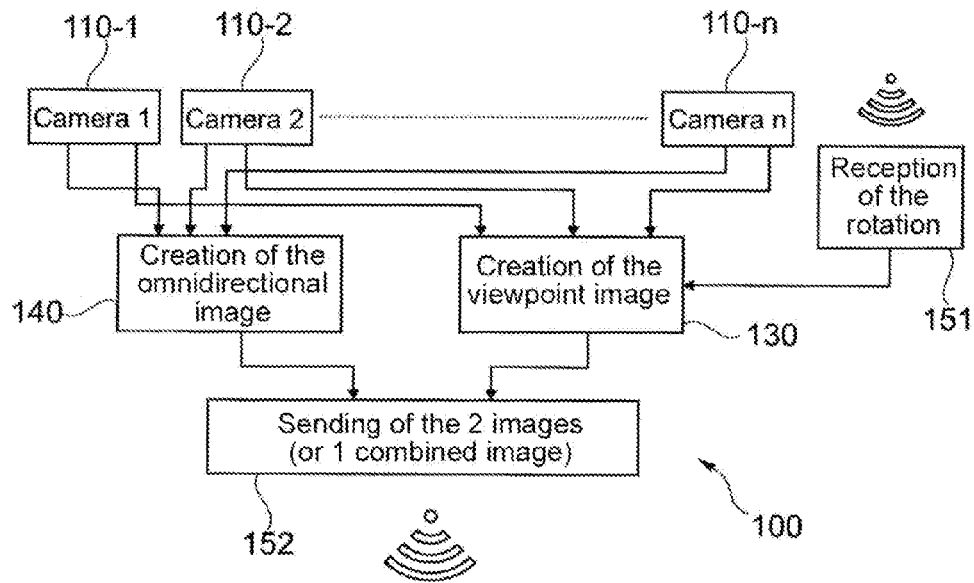
FIG. 7 is a block diagram of the different functionalities implemented in an electronic circuitry on-board the drone.

FIG. 7 illustrates as a block diagram a possibility of implementation of the present invention on the side of the drone 100.

Firstly, it is to be noted that, instead of providing dedicated cameras for the "viewpoint" and the "bird's eye" functions, a same camera can participate both to the generation of a "viewpoint" image and to the generation of a "bird's eye" image.

In this case, the camera 100, unique in the previous embodiment described up to now, may be replaced by a set of cameras. Hence, FIG. 7 schematically shows n cameras 110-1 to 110-n. The outputs of these cameras are connected on the one hand to a circuit 130 for generating a "viewpoint" image, and on the other hand to a circuit 140 for generating a "bird's eye" image. The circuit 140 takes into account only a part of the pixels with respect to circuit 130, to generate an image of lower definition than the circuit 130.

The circuit for the wireless communication with the ground station receives at its receiving part 151 the user's head position information, absolute or relative, and applies this information to the "viewpoint" image generation circuit to adjust, herein by a digital processing of a combined image, of wider field of view than that actually rendered, the sight axis for the image P1 to be rendered.

The images coming from the circuits 130 and 140 are sent to the ground station by the emitting part 152 of the wireless communication circuit.

It will be noted that, for the implementation of the invention, these images may be sent either separately or in a combined manner.

Figure 8:
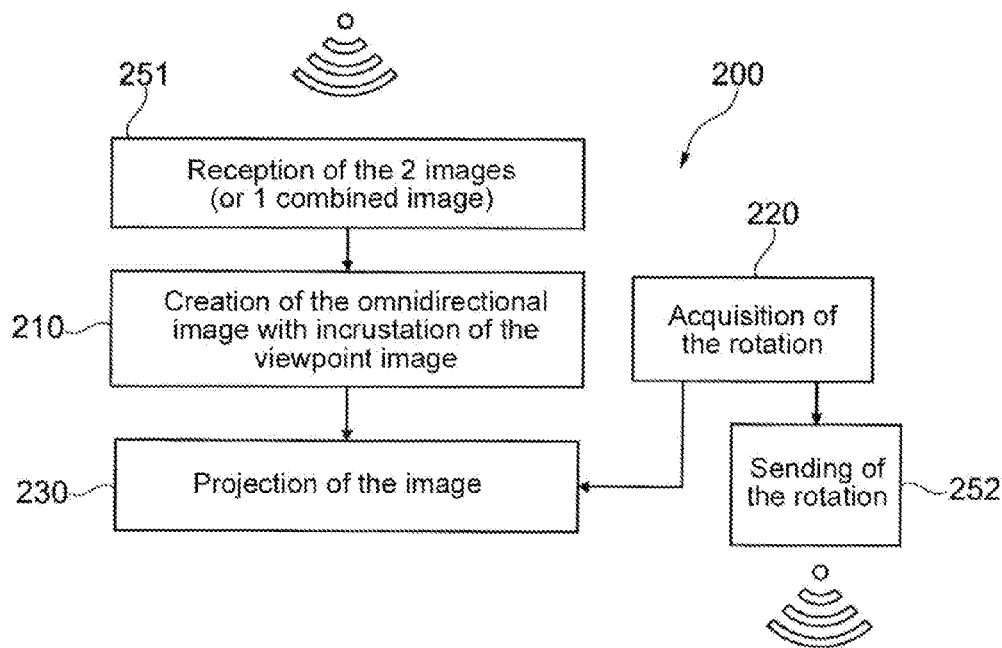
FIG. 8 is a block diagram of the different functionalities implemented in a ground electric circuitry, associated with the glasses.

FIG. 8 schematically illustrates the elements provided in the ground station 200 to implement the invention. The receiving part 251 of the wireless communication circuit receives from the drone the images P1 and P2, either separated from each other or combined with each other. A graphic processing circuit 210 generates from the received images an image of the type of that of FIG. 6A, with the "viewpoint" image, of high definition, incrusted in the "bird's eye" image.

A device 220 for acquiring the user's head rotation, which conventionally equips virtual reality glasses to which the ground station is connected, delivers this information to a graphic processing circuit 230 adapted to perform the cropping operations (the juxtaposition being in this case already made by the incrustation by the circuit 210, as explained), as a function of the position information received from the glasses.

It will be noted herein that, in practice, the circuits 210 and 230 may be consisted by a same circuit.

In parallel, the emitting part 252 of the wireless communication circuit of the ground station sends to the drone the user's head position information for updating the sight view of the "viewpoint" image P1, as explained hereinabove.

With reference now to FIGS. 9A to 9C, other possible configurations of a set of cameras equipping the drone have been illustrated.

In FIG. 9A are schematically shown a "viewpoint" camera 110 aiming along the drone axis and two "bird's eye" cameras whose sight axes are not opposite to each other as in the case of FIG. 1, but oblique to the left and to the right (in the forward direction). Of course, this limits the field of possibilities, in particular if the user fully turns his head to the rear, but allows to have a "bird's eye" image of better quality for a constant bandwidth.

FIG. 9B illustrates the use of only two cameras 111, 112, aiming to the left and to the right. In this case, most of the "viewpoint" images will come from a combination of images captured by the two cameras. As a variant, it may be provided only two cameras aiming to the front and to the rear, respectively.

Finally, FIG. 9C illustrates the use of three cameras 111, 112, 113 of identical resolutions, whose physical sight axes are mutually spaced apart by 120°. Preferably, one of these cameras aims to the front.

Of course, the present invention is not limited in any way to the embodiments described and shown, and the one skilled in the art will know how to make many variants and modifications of them. It applies to drones of various types, for inspection, leisure or other purposes, hovering or not. It also applies to various types of virtual reality glasses, with on-board or remote electronic circuitry.

The invention claimed is:

1. A system for piloting a drone in immersion, comprising:
    a drone provided with shooting means and
    a ground station comprising:
        virtual reality glasses rendering images captured via the shooting means and transmitted from the drone by wireless communication means;
        detecting means for detecting movement of a head of a user wearing the glasses; as well as
        ground graphic processing means adapted to generate rendered images, a first generating means for generating on board the drone a first image, called a viewpoint image, and transmitting the first image to the ground graphic processing means;

modification means provided in the drone to modify a sight axis of the viewpoint image in response movement of the user's head detected by the detecting means and transmitted to the drone via the wireless communication means, a second generating means for generating on board the drone a second image, called a bird's view image, wherein a field of the second image is wider and an angular resolution is lower than the viewpoint image, and transmitting the second image to the ground graphic processing means; and wherein the ground graphic processing means are adapted to generate locally during a movement of the user's head, by a combination of a current viewpoint image and a current bird's view image present in the ground station, images to be rendered, with outlines adjusted as a function of the changes of movement detected by the detecting means.

2. The system of claim 1, wherein the ground graphic processing means are adapted to perform an incrustation of the current viewpoint image into the current bird's view image and to apply variable cropping operations to a so-obtained image.

3. The system of claim 1, wherein the shooting means comprise a set of shooting cameras of wide field of view and of different sight axes.

4. The system of claim 3, wherein the shooting means comprise cameras of different resolutions for the viewpoint image and the bird's view image.

5. The system of claim 4, comprising a first camera whose sight axis is arranged according to a main axis of the drone, and a set of cameras of lower resolutions with sight axes oriented to the left and to the right with respect to the main axis.

6. The system of claim 5, wherein the lower resolution cameras are of complementary fields covering together all directions in a horizontal plane.

7. The system of claim 3, wherein the shooting means comprise cameras of a common set of cameras all having a same resolution, and circuits for generating images of different resolutions from the common set of cameras.

8. The system of claim 3, comprising a set of cameras of complementary fields covering together all directions in a horizontal plane.

9. The system of claim 3, wherein at least certain cameras have optical systems of the fisheye type, and wherein correction means for correcting the distortions generated by the type of optical system are provided.

* * * * *